United States Patent [19]

Takeda et al.

[11] Patent Number: 5,475,957
[45] Date of Patent: Dec. 19, 1995

[54] BUILDING

[75] Inventors: Yukikazu Takeda, Yokohama; Hitoshi Kimura, Osaka, both of Japan

[73] Assignee: Toyo Shutter Co., Ltd., Osaka, Japan

[21] Appl. No.: 156,207

[22] Filed: Nov. 22, 1993

[51] Int. Cl.[6] ............................. E04B 1/70; E04F 17/08
[52] U.S. Cl. ........................................ 52/302.1; 52/220.1
[58] Field of Search ............................. 52/220.1, 506.06, 52/508, 302.1, 302.3

[56] References Cited

U.S. PATENT DOCUMENTS

| Re. 17,154 | 12/1928 | Purdy | 52/220.1 |
|---|---|---|---|
| 90,580 | 5/1869 | Reily | 52/302.3 X |
| 400,431 | 4/1889 | Birely | 52/302.3 X |
| 405,794 | 6/1889 | O'Donnell | 52/506.06 X |
| 1,467,005 | 9/1923 | Lawrence | 52/302.3 X |
| 2,621,765 | 12/1952 | Wood | 52/506.06 X |
| 2,843,364 | 7/1958 | Kähr | 52/220.1 X |
| 3,251,168 | 5/1966 | Waring et al. | 52/506.06 X |
| 3,340,659 | 9/1967 | Hoff | 52/506.06 X |
| 3,435,573 | 4/1969 | Krone | 52/302.3 X |

FOREIGN PATENT DOCUMENTS

| 2519658 | of 1975 | Germany | 52/302.3 |
|---|---|---|---|
| 4022441 | of 1991 | Germany | 52/302.3 |
| 2-27035 | of 1990 | Japan | 52/302.3 |
| 403137335 | of 1991 | Japan | 52/302.3 |
| 404097047 | of 1992 | Japan | 52/302.2 |
| 881235 | of 1981 | Sweden | 52/302.3 |

*Primary Examiner*—Carl D. Friedman
*Assistant Examiner*—Yvonne Horton-Richardson
*Attorney, Agent, or Firm*—Jordan and Hamburg

[57] ABSTRACT

A building has a ventilating space between its inner and outer exterior walls which is capable of effectively saving energy. The building's body has an inner exterior wall on which an outer wall is supported by means of supporting members to form a ventilating space therebetween. The space may also be used for accommodating piping and wiring for connecting main equipment installed on the rooftop of the building with respective terminal devices installed in separate rooms of the building. An air inlet is formed in the lower portion of the new exterior wall, e.g., in the head casing for a second story window, and an air outlet is formed between the inner coping and the outer coping. The outside air enters through the air inlet into the space between the outer and inner walls and flows out therefrom through the air outlet. In summer, such ventilation prevents heat from getting into the rooms of the building via the walls. In winter, the air inlet is closed so as not to allow the flow of air into the space between the walls.

3 Claims, 12 Drawing Sheets

BUILDING

BACKGROUND OF THE INVENTION

The present invention relates to a building which has an outer exterior wall surrounding an inner exterior wall.

It is well known that already existing buildings can be remodeled by repairing the exterior wall or by replacing it using different surface materials. In such cases there is a method for removing or peeling or shaving off the old exterior wall and then covering the building with new wall covering. This method involves such a problem that it requires time for removing the old wall and scatters dust and dirt around the site.

To solve the above-mentioned problems, there has been another known method that builds up a new exterior wall outside an old exterior wall without removing the latter. This method fixes supporting members onto the old exterior wall and then builds a new exterior wall thereon. The method, however, causes such a problem that the building has an apparently thickened external wall with considerably deepened windows. It is desired that the building has a possibly saving space between the old exterior wall and the new exterior wall by using thinner supporting members. Japanese laid-open publication of unexamined application No. 4-42513 describes an attempt to provide a bay window in the new external wall of a building in order to widen a utility space therein. The window space, however, may be used for placing jardinieres and decorations there and for providing a traverse rod for suspending curtains. It is preferred that the space between the new wall and the old wall is as small as possible.

It is also noticed that renewing in the exterior wall of a building by the above-mentioned method is considerably expensive and makes no particular contribution to improving the function of the building itself except for a small effect on the thermal insulation of the new wall and the provision of the bay windows therein.

Recently, in many cities there have been built so-called intelligent buildings wherein a variety of facilities such as electric services, plumbing, electric communication, gas fitting system and so on are used in various ways. Many old buildings generally have no space for accommodating pipes and cables required for introducing intelligent terminals into the buildings.

In the case of designing and constructing a new building, it is possible to provide a duct space large enough to accommodate therein piping and wiring for intelligent equipment to be introduced in the future, but this duct space may limit the design possibilities and sacrifice the possible floor space of the building.

In the case of designing a new building with no consideration to providing high technology facilities in the future, it is necessary to provide the least needed duct space which may also limit the design possibilities in relation to the partitioning of the floor space.

SUMMARY OF THE PRESENT INVENTION

An object of the present invention is to provide a building which has a ventilating space between its inner external and outer external walls, which is effective not only for saving energy consumption but also to accommodate therein piping and wiring necessary for introducing high technology equipment into the building.

Another object of the present invention is to provide a building which has the outer external wall secured by supporting members installed on the inner external wall to form a ventilating space between the walls and which has ventilating facilities at least at the upper and lower sides of the outer external wall.

DESCRIPTION OF THE PREFERRED EMBODIMENTS

According to the present invention, it is possible to form a new outer exterior wall outside of an old inner exterior wall that is, the exterior wall of an already existing building. It is also possible to build a new building having a double-wall construction composing of an outer exterior wall and an inner exterior wall.

The present invention is intended to form a new outer exterior wall on top of an exiting inner exterior wall as well as to build new buildings having a double wall construction consisting of an outer exterior wall and an inner exterior wall. The free space which is formed between the outer and inner exterior walls of a building, may be utilized for creating air flow therein by means of ventilating mechanisms provided thereat to remove heat from the outer exterior wall and to prevent the room temperature from rising during a hot period requiring air conditioning. It may also be utilized to transfer solar radiation energy through the double wall into the rooms of the building by shutting off ventilating mechanisms during winter.

Furthermore, any existing building may be remodeled to have an outer exterior wall over its old exterior wall to produce therebetween a space for accommodating ducts and wiring for high technology equipment. The structure may be converted into an intelligent building without reducing the effective interior space of the rooms while still providing for piping and wiring related to high technology equipment. In a new double-walled building, a space between the outer wall and the inner wall may be created, wherein all necessary piping and wiring for computer terminals can be laid out without any alterations to the partitions on any floor of the building.

Figure 1:
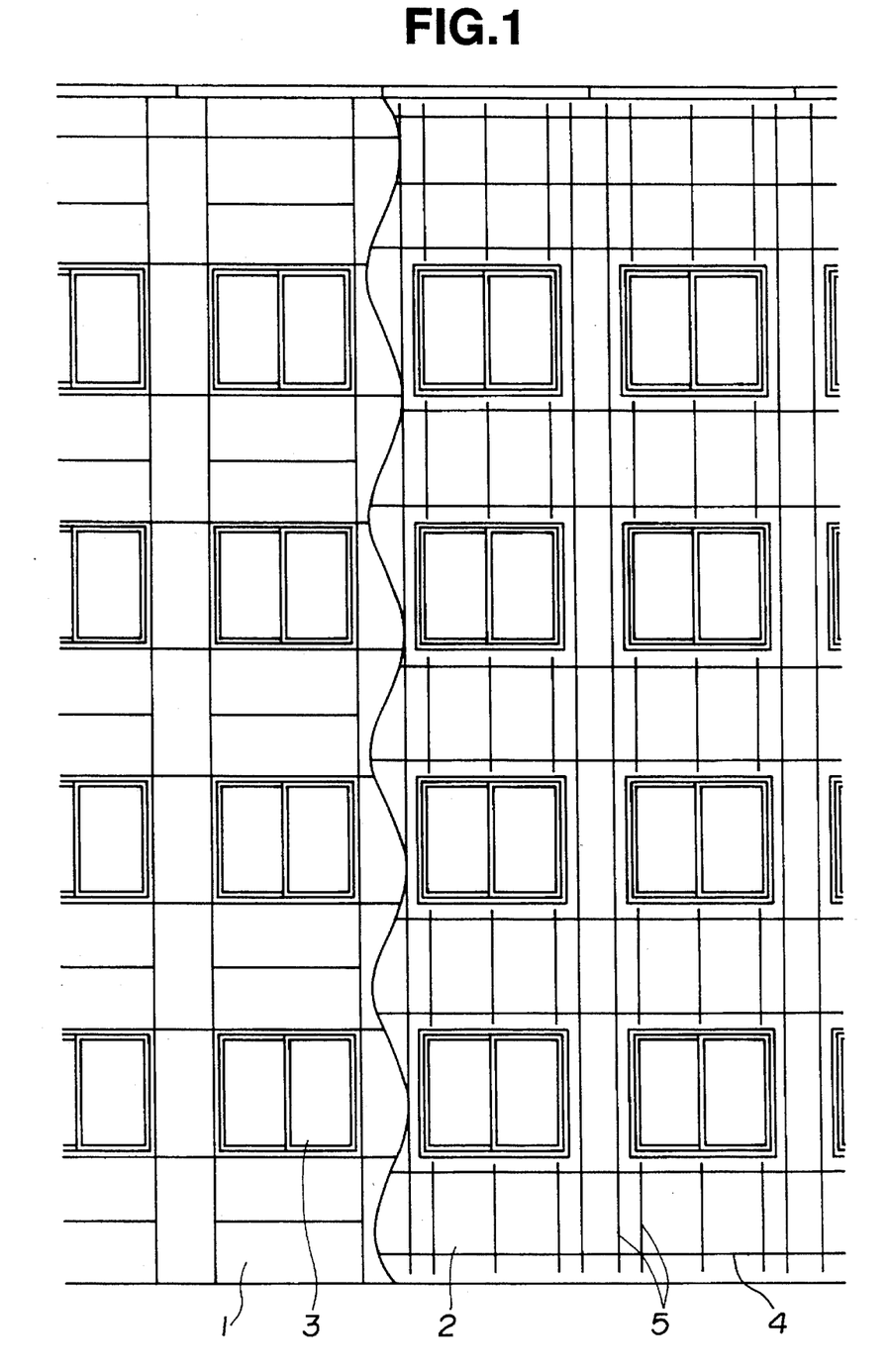
FIG. 1 is a schematic front view showing a part of a building embodying the present invention.
Figure 2A:
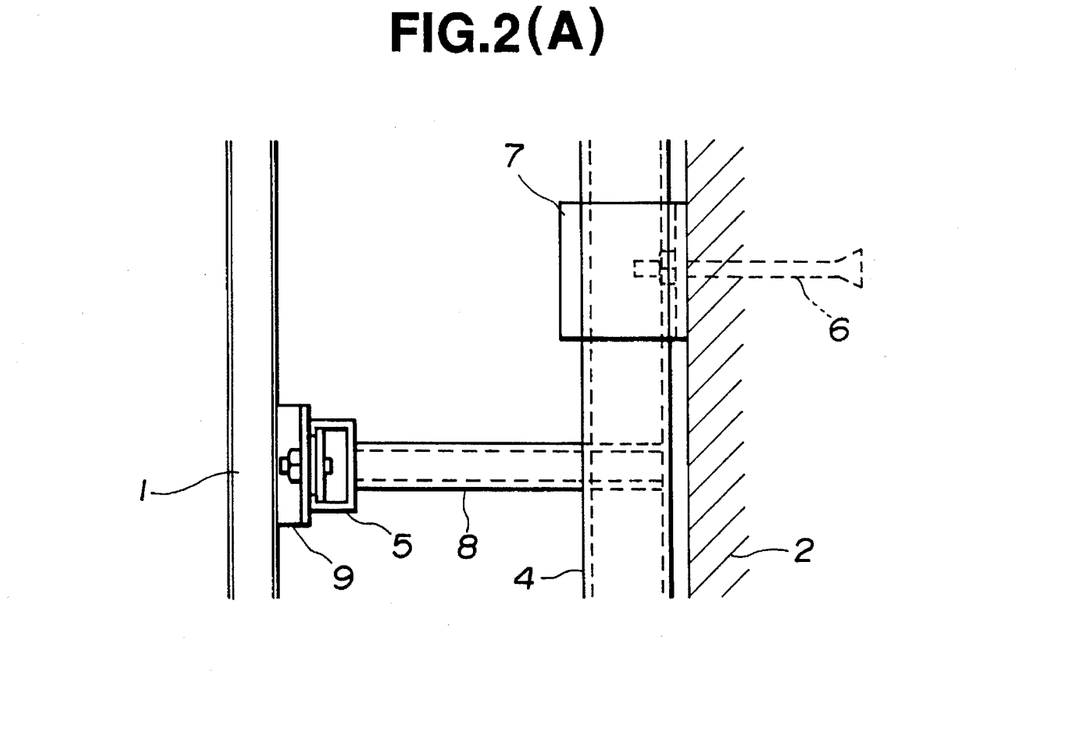
FIGS. 2(A) 2(B) are views for explaining an example of installing furring (setting bed) materials for a building according to the present invention.
Figure 2B:
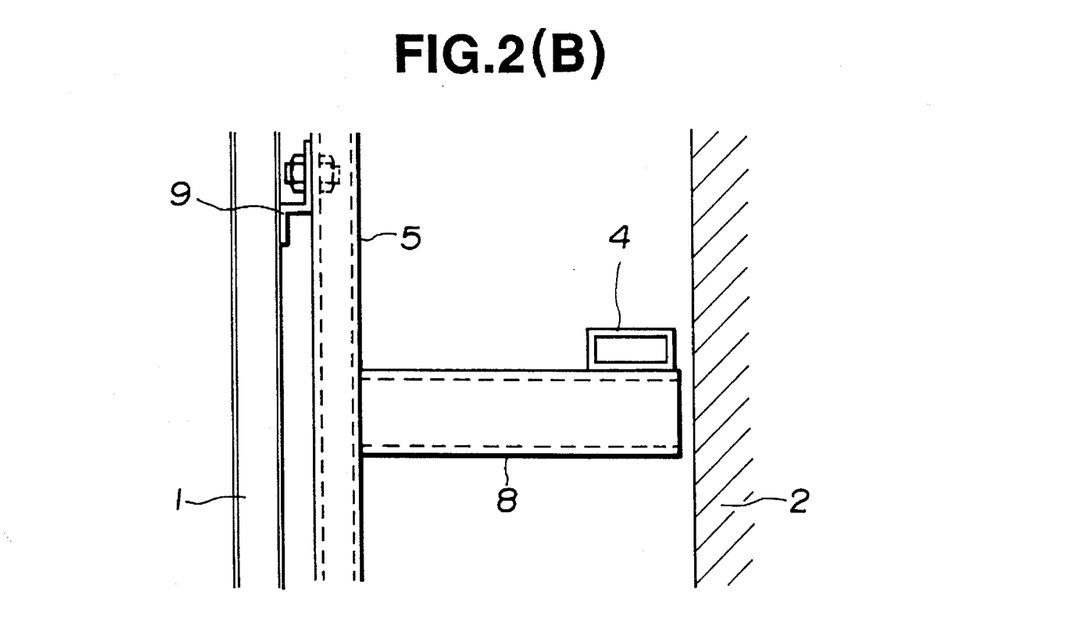
Figure 3:
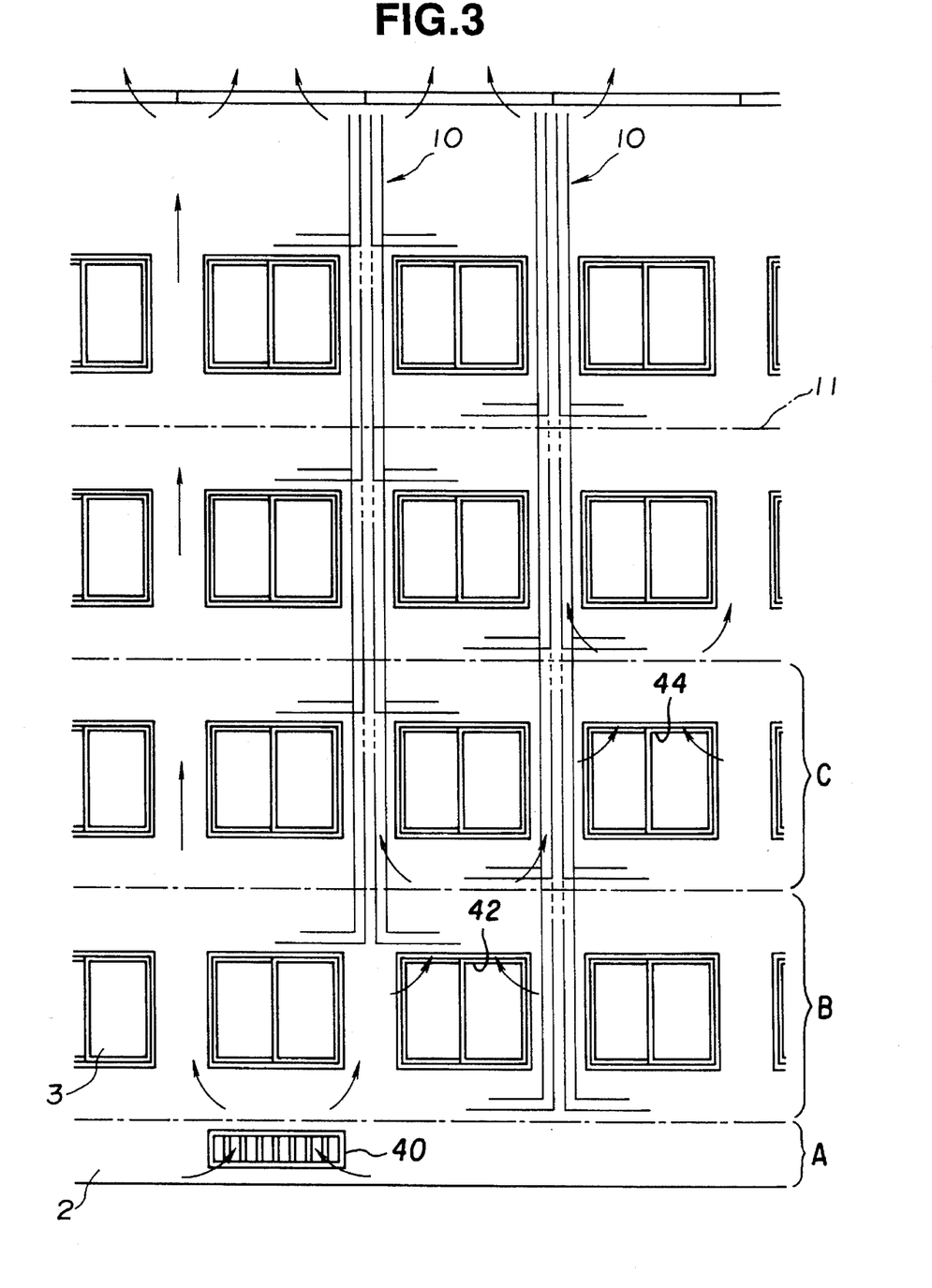
FIG. 3 is a view for explaining the conditions of the flow of air in a building, according to the present invention.

FIGS. 1 to 4 are views for explaining a prototype building embodied in the present invention. FIG. 1 is a schematic front view showing a part of a building, FIGS. 2(A) and 2(B) are views for explaining an example for installing furring members, FIG. 3 shows a layout of piping and FIGS. 4(A) and 4(B) are sectional side views of the building. In these drawings, there are shown an outer exterior wall 1, an inner exterior wall 2, a window 3, a horizontal furring member 4, a vertical furring member 5, an anchor bolt 6, a bracket 7 for securing the furring members, a supporting member 8, a bracket 9 for securing a panel, piping 10, a floor line 11, devices 12, 12a, 12b, 12c, a building's body foundation 13, a floor 14, an inner coping 15 and an outer coping 16.

As shown in FIG. 1, this building has four stories. The left half shows the building with an outer exterior wall 1 and the right half shows the building not covered with an outer exterior wall 1. The windows 3 are provided in the inner exterior wall of the building. Each window 3 may be the same as it was in the old exterior wall of the already existing building or may be newly fitted in the place from which the old one was removed. It is also possible to provide a new window in the outer exterior wall of the building which matches the existing one to form a double window or to provide a new window in the outer exterior wall and remove the old window from the inner exterior wall of the building. The outer exterior wall 1 is secured to the inner exterior wall 2 in such a manner that horizontal furring members 4 are first secured to the inner exterior wall 2, vertical furring members 5 are secured with brackets (not shown) to the wall and the outer exterior wall 1 is then secured to the vertical furring members 5. In the shown embodiment, the horizontal furring members 4 are fitted all over the wall but it may be cut off partly. The vertical furring members 5 are also installed between the windows.

Referring to FIGS. 2(A) and 2(B), the manner of securing the furring members to the walls will be explained as follows:

FIG. 2(A) is a top view and FIG. 2(B) is a side view of the exterior walls. The inner exterior wall 2 is shown partly as hatched to be viewed more easily. A bracket 7 for fixing the horizontal furring member is secured with an anchor bolt 6 driven into the building's surface through the inner exterior wall 2. The horizontal furring member 4 and the supporting member 8 are secured by means of welding or with a bolt to the bracket 7. The vertical furring member 5 is secured by means of welding or with a bolt to the supporting member 8 and the outer exterior wall 1 is then fixed to the supporting member 8 by means of a panel fixing bracket 9.

The length of the supporting member 8 is selected in such a way that a space may be created between the outer exterior wall 1 and the inner exterior wall 2 to allow effective ventilation therethrough. Air vents are provided in the lower portion and the upper portion of the outer exterior wall. The air vents, described in detail later, are preferred to be closable when the need be. In FIG. 3, there is shown a fixed or movable louver in the portion A of the outer exterior wall of the first floor of the building near the ground, an air vent 42 in a head casing for the head frame of a window 3 in the first-story portion B of the outer exterior wall, and an air vent 44 in the head casing for the head frame of a window 3 in the second-story portion C of the outer exterior wall of the building. The upper air vents (outlets) may, as described later in detail, consist of spaces formed between the inner coping and the outer coping.

In summer, the atmospheric temperature is high and the sun is hot. The wall, irradiated by the sun's rays, may have an increase in temperature and transfer the heat into the rooms of the building thereby decreasing the cooling effects of the air conditioning system therein. The creation of ventilation in the space between the outer exterior wall and the inner exterior wall can be effective to remove the heat from the outer exterior wall thereby preventing the heat from entering the rooms through the inner exterior wall. Thus the amount of energy consumed for cooling the air in the rooms of the building can be reduced. If the ground near the building has a lower temperature, because there is much greenery, air vents 40 are preferably provided in the portion A shown in FIG. 3. If the ground near the building is paved and produces a large amount of radiant heat, the atmospheric temperature will be lower at higher levels. Under such conditions, the air vents are preferably provided in the first story portion B or the second story portion C shown in FIG. 3. The outside air enters through the air vents (inlets) into the space between the two walls, flows upward as shown by the arrows and flows out of the building through the upper vents thus removing the heat from the inside surface of the outer exterior wall. Consequently, the raising of the room's temperature inside the building due to the outside temperature can be minimized and the energy consumption for cooling the building can be saved considerably.

In winter, all the vents are closed in order not to create air flow in the space between the two walls. The air enclosed in the space between the walls may be heated by solar heat transferred through the outer exterior and may keep the wall from being cooled by the outside air. It may also serve as a heat-and-noise insulation layer that realizes a considerable saving of energy and provides improved insulation of the building from outside noises.

The space between the walls may accommodate piping and writing therein.

As shown in FIG. 3, piping and wiring are arranged between the vertical and horizontal rows of the windows 3. The piping 10 shown in FIG. 3 is used for air-conditioning but it is not limited to such an application and may be for gas pipes, water and sewer pipes, conduits for power lines and communications cables. The communications wiring may include telephone wires, coaxial cables, fiber optic cables or for control cables for interconnecting rooms of the building or connecting to outside lines.

The pipes and cables are connected to respective devices installed in the respective rooms of the building. FIG. 3 minimally illustrates the case for leading the pipes into a floor and a ceiling. The dotted line portion of the piping is not connected to the piping shown by a solid line since they are different pipe lines. Accordingly, pipes and cables may be separately connected to respective devices or branches of the main piping and wiring may be connected thereto. These pipes and cables are usually connected to central equipment installed in a control room and a mechanical room wherefrom corresponding terminals in separate rooms of the building are controlled or driven. The main equipment may be installed on any desired floor or on the roof of the building.

Figure 4A:
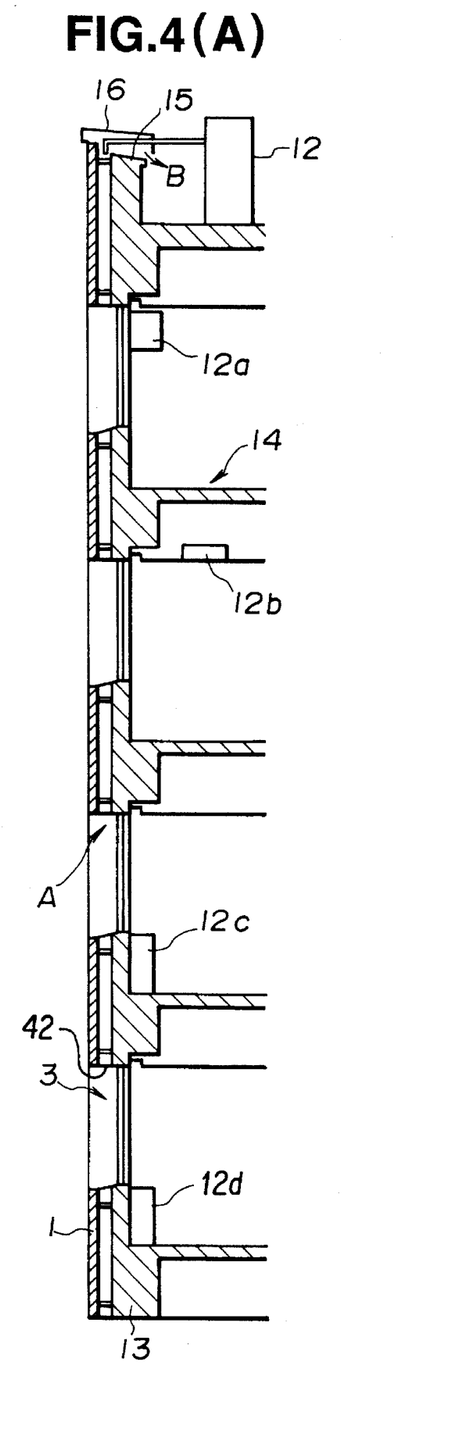
FIGS. 4(A) and 4(B) are sectional side views of a building, embodied in the present invention.
Figure 4B:
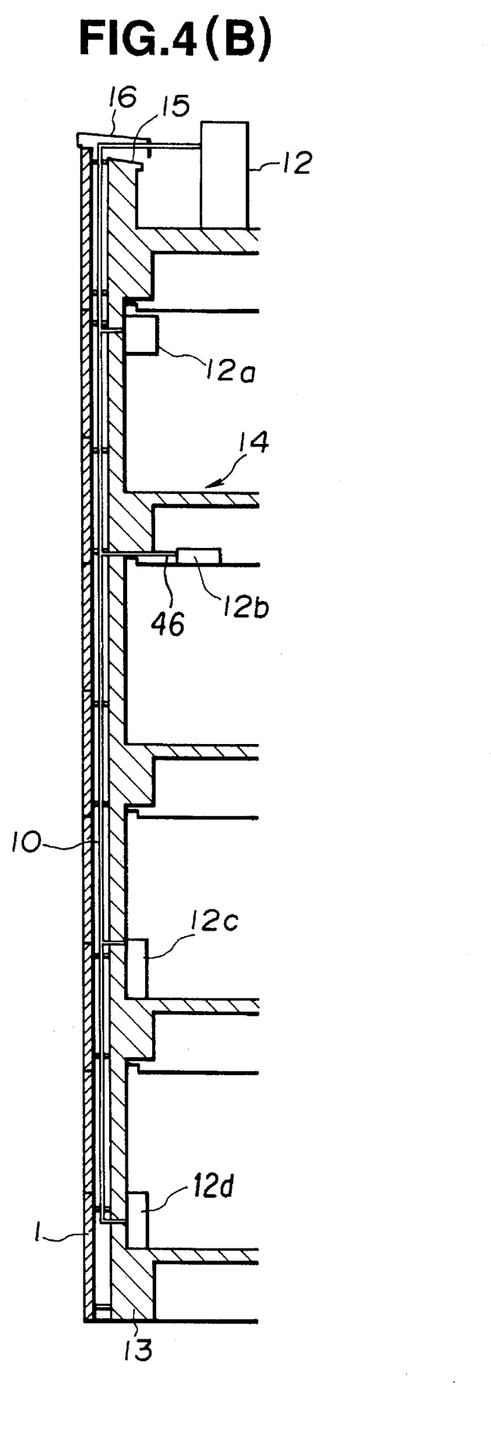

FIGS. 4(A) and 4(B) show examples of an arrangement of air-conditioning installed and its piping.

FIG. 4(A) is a section taken on a line passing windows and FIG. 4(B) is a section taken on a line passing between windows. As shown in the FIG. 4(A), outside air enters into the space between the outer exterior wall and inner exterior wall through an air vent formed in the upper casing of a frame of a window 3 in the outer exterior wall on the second floor of the building and then flows out of the space through an air vent formed between the inner coping 15 and the outer coping 16. Ventilators may be installed at suitable places to create forced ventilation through the space between the walls of the building.

Piping is made to supply air from the main equipment 12 to the terminal devices 12a, 12b and 12c and 12d which are installed respectively, on the interior wall (near the ceiling), and on the ceiling and floor respectively. Control cables (not shown) and piping 46 also laid from the main equipment to the terminal devices 12a, 12b and 12c and 12d. As shown in FIG. 4(B), the piping 10 is accommodated in the space between the inner exterior wall and the outer exterior wall 1 of the building. In the shown case, the piping and wiring extend through the opening formed between the inner coping 15 and the outer coping 16 and then connected to the main equipment 12 installed on the rooftop of the building. According to the present invention, it is possible to introduce new facilities in the building without providing piping and wiring inside the building.

Figure 5:
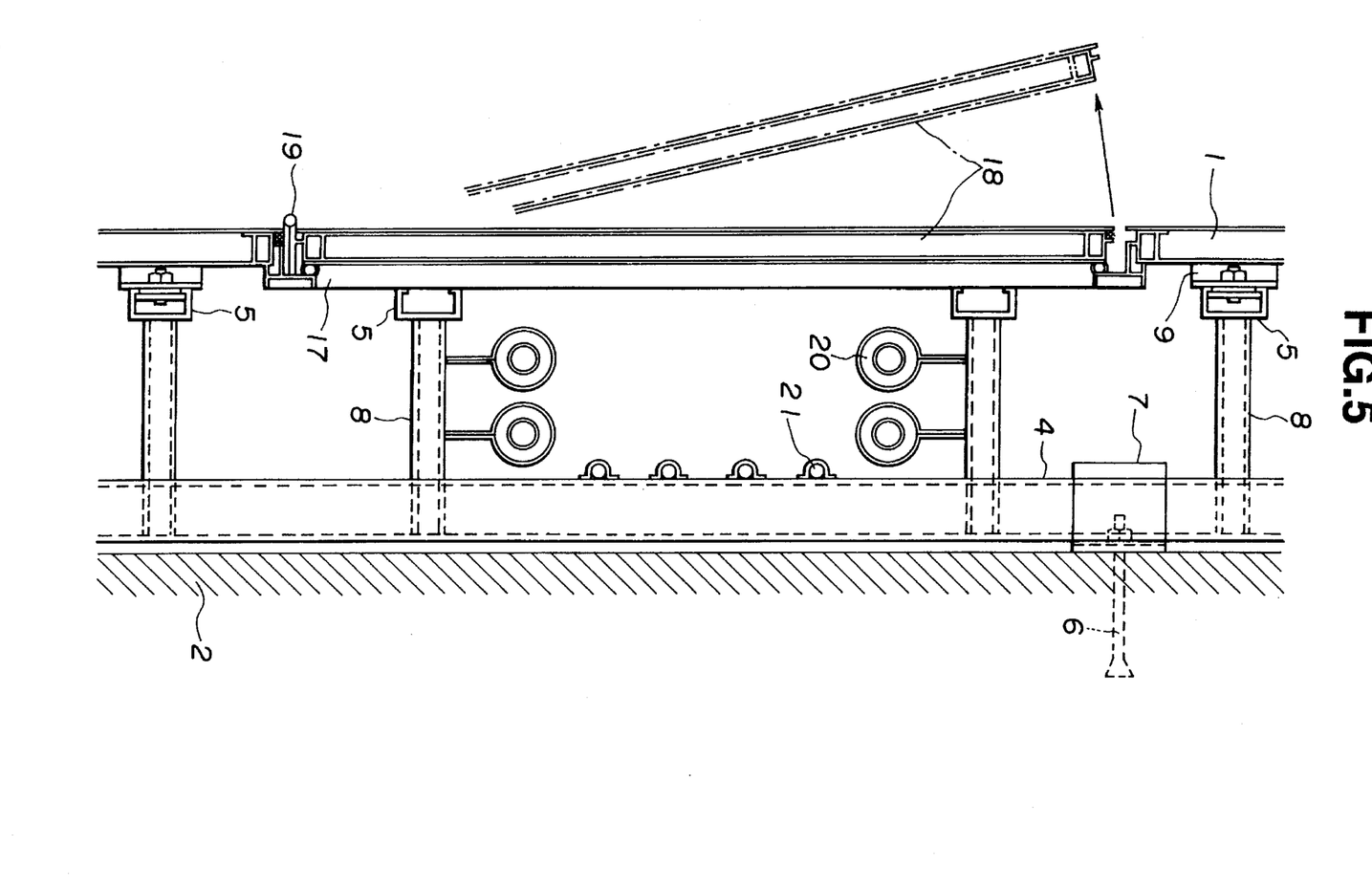
FIG. 5 is a view for explaining an example of a supporting structure for pipes and cables.

FIG. 5 is a view for explaining an example of a supporting system for piping and wiring. Parts similar to those shown in FIGS. 1 to 4 are designated by the same numerals without additional descriptions. There is still shown a frame member 17, a swinging panel 18, a butterfly hinge 19, heat-insulated pipes 20 and cables 21. In FIG. 5, the vertical piping and wiring are viewed from the top of the building. For their easy maintenance, a part of the outer exterior wall is made in the form of a swinging panel 18 that is supported by the butterfly hinge 19 fixed onto the frame member 17 and secured to the vertical furring member so it can swing in the direction shown by the arrow. However, panels of the outer exterior wall at the piping and wiring portions are not necessarily swingable. The piping 20 is treated for heat-insulation and secured to a supporting member 8 by means of pipe clamps. The supporting member 8 can be a channel that can easily support the piping at its groove. Each cable 21 is secured with clamps to a horizontal furring member 4. The piping may be similarly fixed thereto. The pipes and cables thus secured on the supporting members and furring members are effectively protected from being damaged due to displacement in the space between the walls of the building. The space for ventilation is still assured between the walls wherein the pipes and cables are accommodated. If all the space is needed for ventilation, it is not necessary to accommodate pipes and cables therein.

Figure 6:
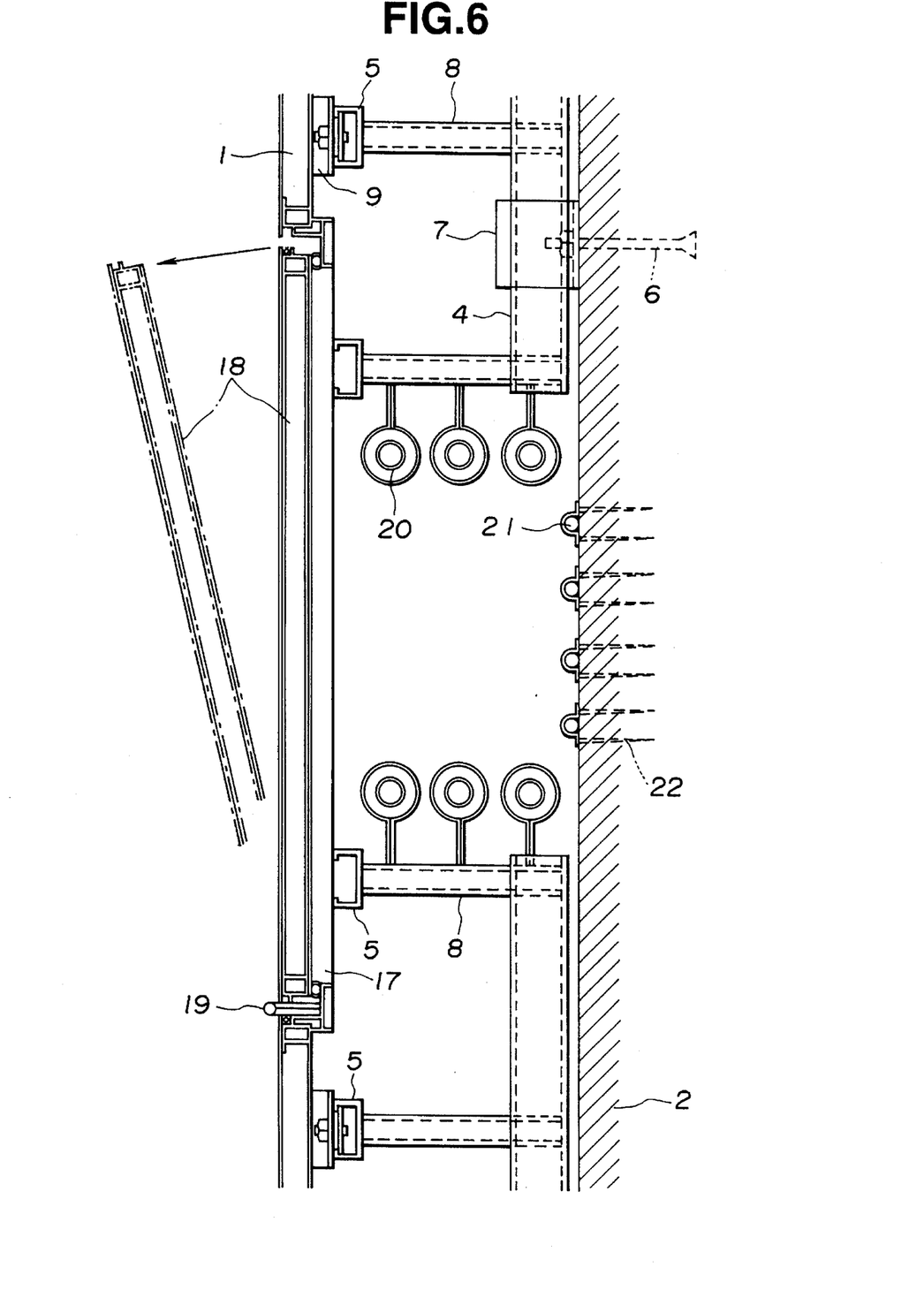
FIG. 6 is a view for explaining another example of a supporting structure for pipes and cables.

FIG. 6 is a view for explaining another example of a supporting structure for pipes and cables. In FIG. 6, numeral 22 designates a concrete nail and other parts similar to those shown in FIGS. 1 to 5 are indicated by the same reference numerals. In this embodiment, the vertical space between the walls does not accommodate horizontal furring members 4 to assure wider accommodation space. Each clamp for a cable 21 is secured with a concrete nail 22 to an inner exterior wall 2 that is used as a supporting member for the pipe and cables in the case shown.

Figure 7:
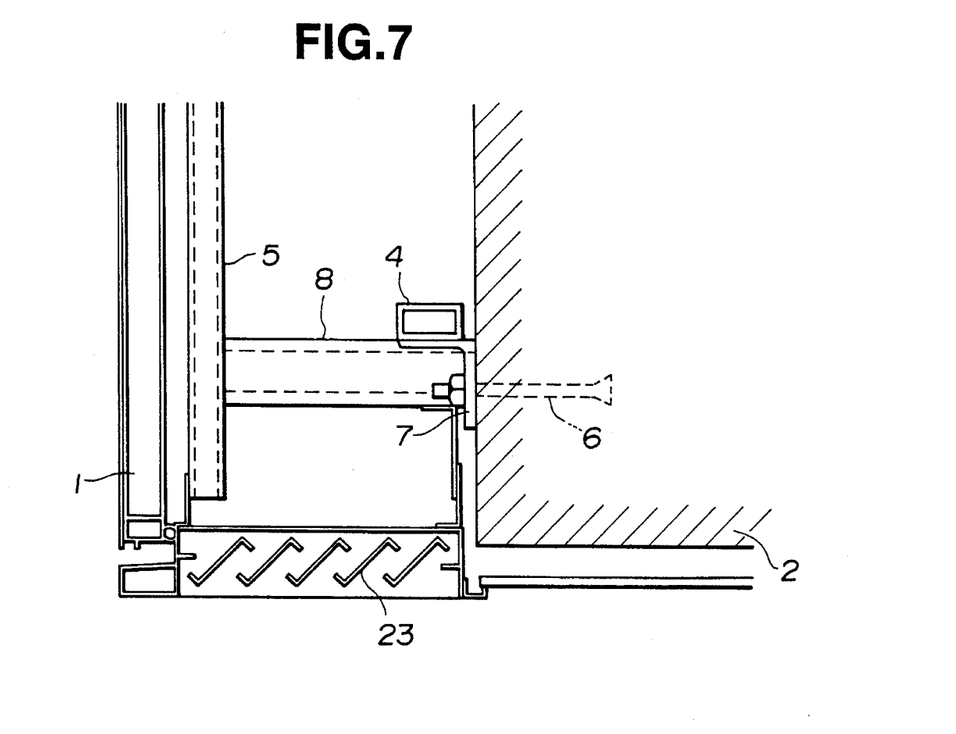
FIG. 7 is a sectional view of an example of an air vent provided in the lower portion of an outer exterior wall.

FIG. 7 is a sectional view of an example of an air vent (inlet) provided in the lower portion of an outer exterior wall. In FIG. 7, numeral 23 designates a louver and other parts similar to those shown in FIGS. 1 to 4 are indicated by the same reference numerals. In this embodiment, the air vent is formed in a head casing for the window frame and is provided with the louver 23 that can be opened or closed as the need arises. As described above, the air vent may be used open in summer and closed in winter. It is possible to remotely control the louver 23 by electrically moving it from a control room or to automatically control the louver's operation according to the atmospheric temperature and sunshine by using a sensor. It is also possible to use a louver 23, whose driving portion or vanes are partly made of a shape memory alloy and whose opening can automatically be regulated according to the atmospheric temperature.

Figure 8:
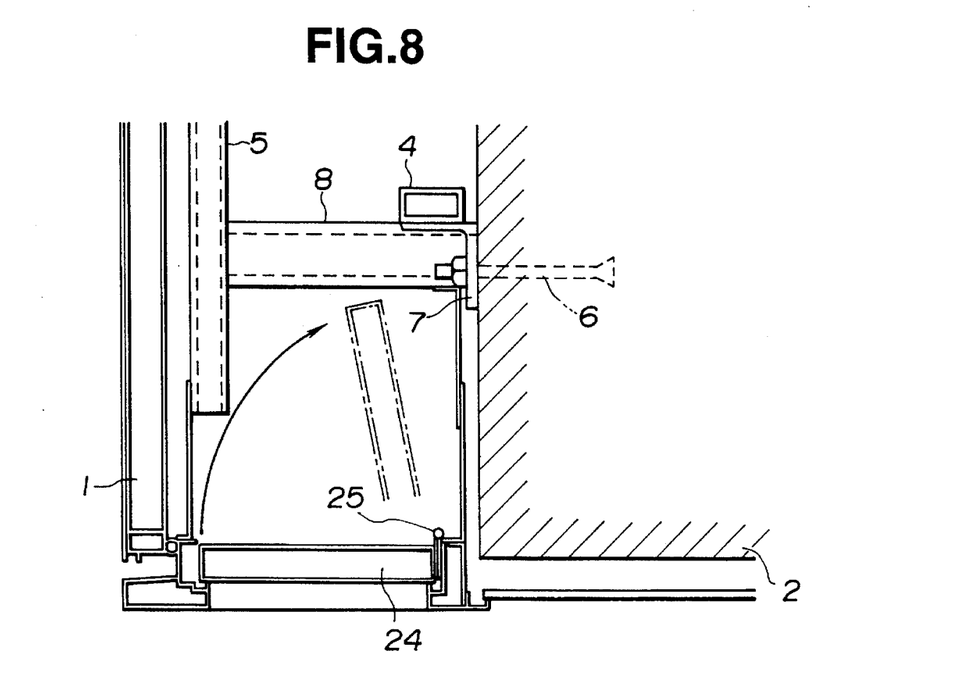
FIG. 8 is a sectional view of another example of an air vent provided in the lower portion of an outer exterior wall.

FIG. 8 is a sectional view of another example of an air vent provided in the lower portion of an outer exterior wall. In FIG. 8, numerals 24 and 25 designate, respectively, a hinged cover and a hinge. Other parts similar to those shown in FIGS. 1 to 4 are indicated by the same reference numerals. In this embodiment, an air vent is provided with a hinged cover 24 that is swingable about the axis of the hinge 25. Similarly with the embodiment of FIG. 7, it is possible to use an electric drive or other suitable driving mechanism for the swinging cover. The air vent is preferably provided in the upper casing of a window in view of possible weathering but it may also placed be in the outer exterior wall.

FIGS. 9 to 13 are diagrammatic construction views of examples of air vents (inlets) provided in the upper portion of an outer exterior wall.

Figure 9:
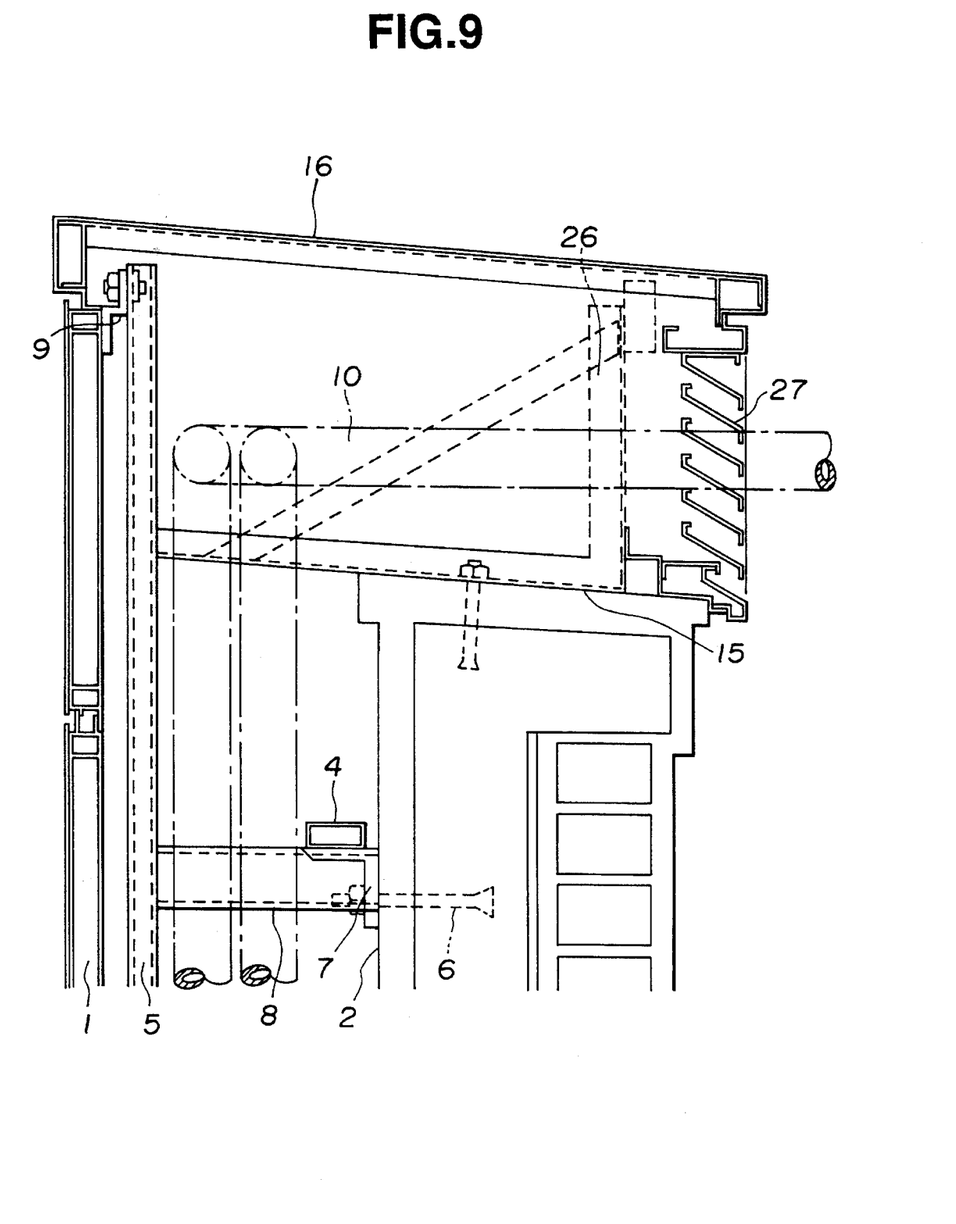
FIG. 9 is a schematic construction view of an example of an air vent provided in the upper portion of an outer exterior wall.

FIG. 9 shows an air vent provided with a louver 27 and a supporting member 26. Other parts similar to those shown in FIGS. 1 to 4 are indicated by the same reference numerals. The supporting member 26 is secured to an inner coping 15 and then an outer coping 16 is secured to the supporting member 26. This supporting member 26 forms an inter-wall ventilation space through which piping 10 can be led onto the roof top of the building. In this embodiment, the louver 27 is installed in a portion of the air vent, where no piping is led through. As described, with reference to FIG. 3, vertical piping is accommodated in the space between the walls in such a way that it may be laid between the vertical row of windows i.e., in side the air passage. Since the air passage preferably goes straight upward, the louver is preferably installed directly at the end of the air passage. The piping may change its route and be led out through a region above a window. The cables not shown are laid out in the same way as the piping. The louver may be driven either manually or automatically as described in the embodiment of FIG. 7.

Figure 10:
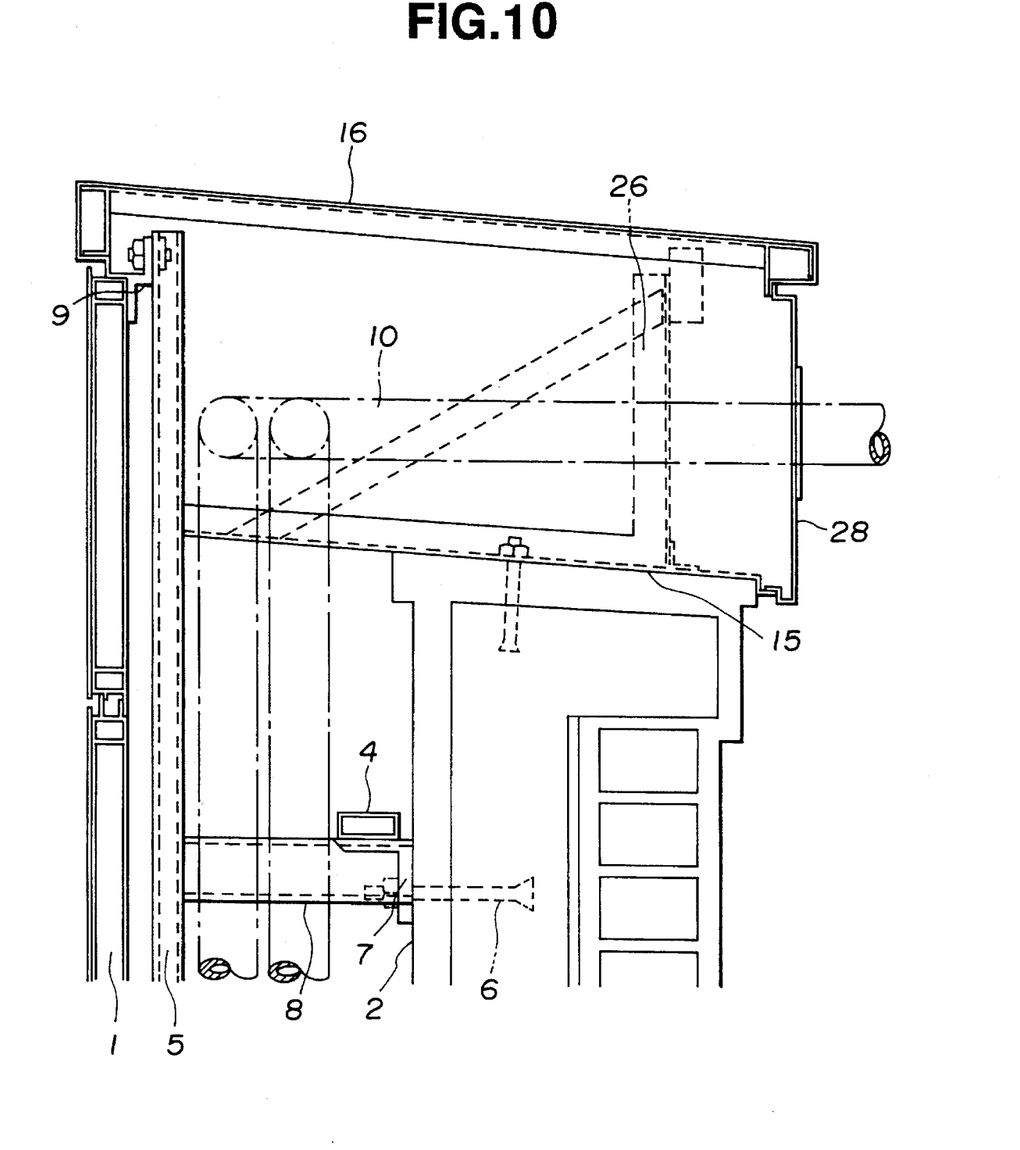
FIG. 10 is a schematic construction view of a cover plate provided in the upper portion of an outer exterior wall.

FIG. 10 is a diagrammatic construction view of an outlet portion for leading out piping and wiring, where no louver is provided. A cover plate is shown 28. Other parts similar to those shown in FIGS. 1 to 4 are indicated by the same reference numerals. The cover plate 28 has an opening made therein for leading the top end of the piping and cables out. It may be divided into two halves, each having a semi-circular shape. The piping 10 is enclosed in the portions of the split cover plate 28. In this case the portions of the plate are preferably overlapping on each other in the case of weathering.

Figure 11:
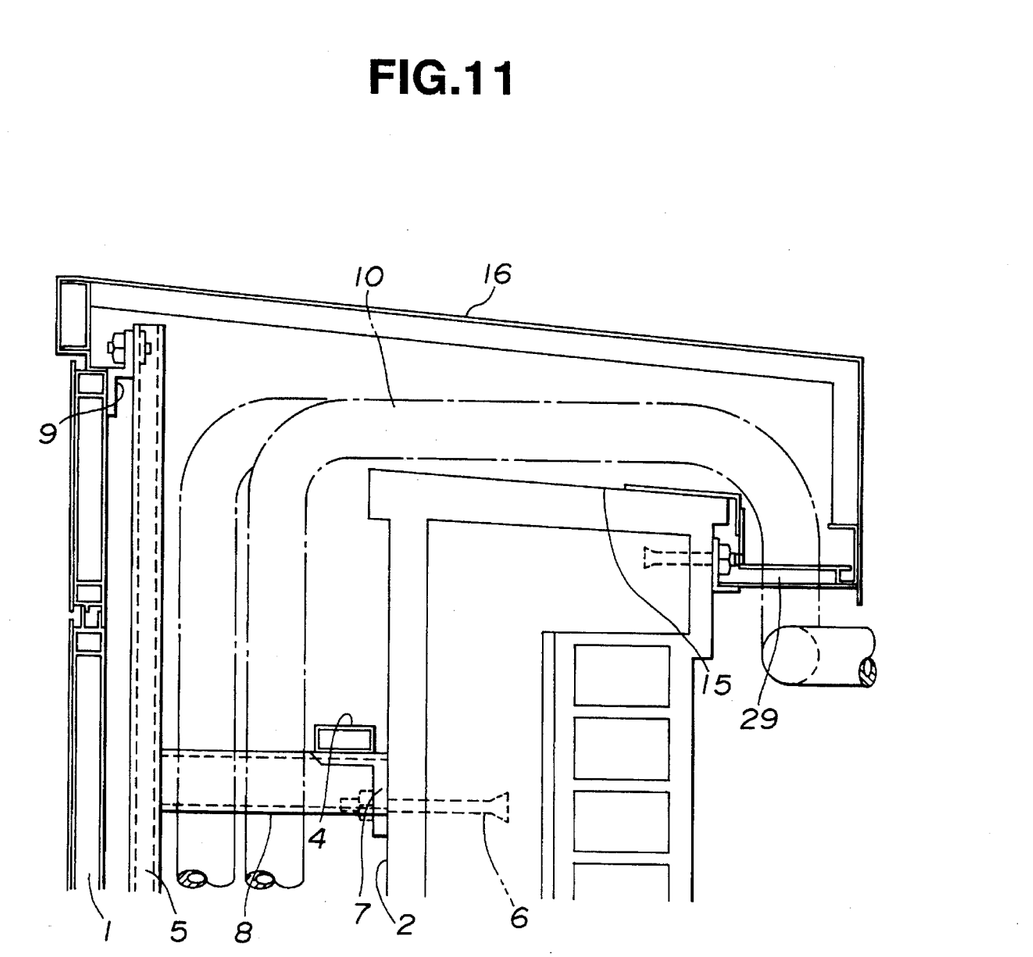
FIG. 11 is a schematic construction view of another example of an air vent provided in the upper portion of an outer exterior wall.

FIG. 11 shows an embodiment wherein an inner coping is placed backward and covered with an outer coping. In FIG. 11, numeral 29 designates a piping portion leading out. Other parts similar to those shown in FIGS. 1 to 4 are indicated by the same reference numerals. Since the outer coping 16 extends to cover the inner coping 15 from the back side, there is no fear of rain falling into the opening therebetween.

Figure 12:
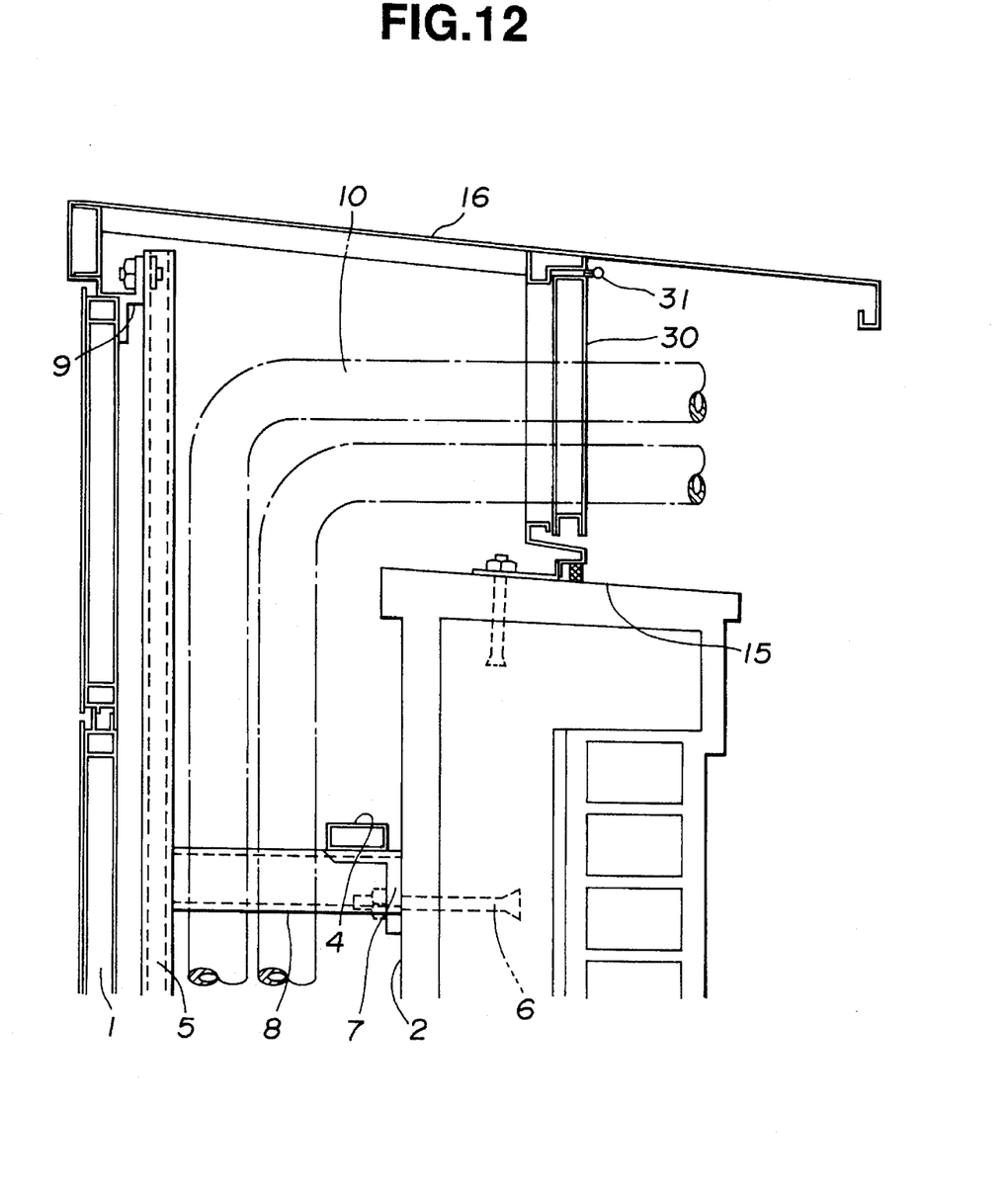
FIG. 12 is a schematic construction view of another example of an air vent provided in the upper portion of an outer exterior wall.

FIG. 12 shows an embodiment of a hinged cover 30 with a hinge 31. Other parts similar to those shown in FIGS. 1 to 4 are indicated by the same reference numerals. Similarly with the embodiments of FIGS. 9 and 10, the hinged cover 30 is placed in the portion where no piping and wiring is led. The cover 30 can be moved either manually or automatically. It is also possible to use a sliding cover instead of a hinged cover.

Figure 13:
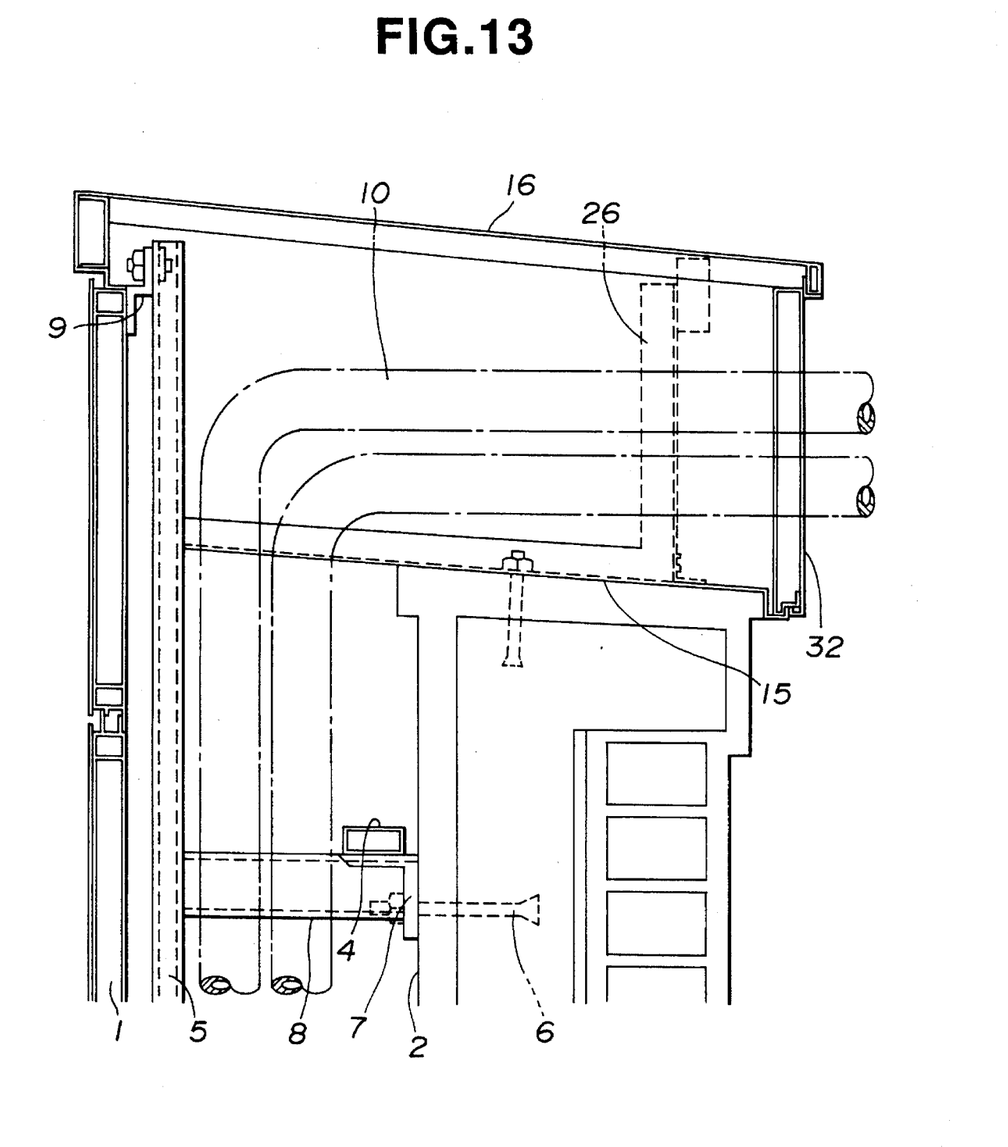
FIG. 13 is a schematic construction view of another example of an air vent provided in the upper portion of an outer exterior wall.

FIG. 13 shows an embodiment wherein a fixed cover 32 is removable. Other parts similar to those shown in FIGS. 1 to 4 are indicated by the same reference numerals. Similarly with the embodiments of FIGS. 9 and 10, the removable fitted cover 32 is placed in the portion where no piping and wiring are led out. The cover 32 may be placed on in certain seasons or removed in other seasons.

As is apparent from the foregoing, the present invention provides a building having a ventilating space between the outer exterior wall and the inner exterior wall. This is effective for saving energy and to accommodate piping therein and/or wiring necessary for introducing computer or other high technology terminals into the building.

We claim:

1. A building comprising a vertical inner wall means and a vertical outer wall means spaced from said inner wall means to thereby define a space between said inner, and outer wall means, mounting means in said space mounting said outer wall, means on said inner wall means, utility lines, securing means securing said utility lines in said space, said outer wall means having a lower portion, inlet air means in said lower portion of said outer wall, mean for admitting atmospheric air into said space, said inner and outer wall means each having an upper end portion, outlet air means disposed at said upper end portions of said inner and outer wall means for discharging air from said space to the outside atmosphere, whereby the temperature within the building is controllable by the atmospheric air flowing upwardly from said inlet air means to said outlet air means, said inner wall means comprising a generally flat inner wall structure, said outer wall means comprising a generally flat outer wall structure, said inner and outer wall means further including window casing means adjacent the outer wall lower portion including a window and an upper window casing wall extending generally between said flat inner wall structure and said flat outer wall structure, said upper window casing wall being horizontally disposed and being generally perpendicular to said flat inner and outer wall structures, said inlet air means being disposed in said upper window casing wall, coping means on said upper ends of said inner and outer wall structures and extending over said space between said inner and outer wall structures, said coping means comprising an outer wall coping structure on said upper end of said outer wall structure and an inner wall coping structure on said upper end of said inner wall structure, said outer wall coping structure overlying said inner wall coding structure to define a generally transverse air passage between said outer wall coding structure and inner wall coping structure, said outer wall coping structure having an extended part which extends to a position displaced from overlying said inner wall coping structure, said extended part defining a generally vertical air passage which is in communication with said transverse air passage, said vertical air passage having a lower end said outlet air means being disposed at said lower end, said air outlet air means being generally planar and being horizontally disposed.

2. A building according to claim 1 further comprising passages in said inner wall means extending between said space and the interior of the building, said utility lines having branch portions extending through said passages to the interior of the building.

3. A building according to claim 1 wherein said utility lines which pass through said space between said inner and outer wall structures, through said transverse air passage and through said vertical air passage have a substantially inverted U-shaped configuration.

* * * * *